Patented June 15, 1943

2,321,989

UNITED STATES PATENT OFFICE 2,321,989

TRIAZONE RING COMPOUND

William James Burke, Wilmington, Del., assignor to E. I. du Pont de Nemours & Company, Wilmington, Del., a corporation of Delaware No Drawing. Application January 15, 1942, Serial No. 426,905

10 Claims. (Cl. 260—248)

This invention relates to new monomeric heterocyclic compounds. More particularly it relates to bis-(alkoxymethyl) tetrahydrotriazones having a substituent in the 5-position and methods for their preparation.

Tetrahydrotriazones can be prepared conveniently and economically from urea, formaldehyde, and primary amines. These compounds are solid but quite unstable to heat, and generally not very reactive. They have therefore not been very widely utilized.

This invention has as an object the preparation of more widely useful compounds from tetrahydrotriazones. A further object comprises new textile modifying agents, new polymer components and new plasticizers for cellulose, cellulose derivatives, e. g. the acetate, butyrate, and ethylcellulose, polyamides, etc. Other objects will appear hereinafter.

These objects are accomplished by the following invention of compounds of the formula

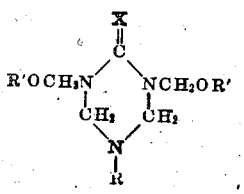

where R and R' are monovalent aliphatic hydrocarbon radicals which may be saturated or unsaturated, acyclic or cyclic, unsubstituted or substituted by inert groups such as hydroxy, alkoxy, aryl, etc., and X is a chalcogen of atomic weight less than 33 and their preparation by reacting a tetrahydrotriazone with formaldehyde and then with an alcohol.

The products of this invention are relatively stable, water-white liquids. They possess characteristic odors resembling those of the aliphatic amines. The lower members are soluble in water, alcohols, esters, and acetone whereas the higher members are not soluble in water and are more soluble in hydrocarbons. Some of the products of this invention, e. g. those containing hydroxy substituted aliphatic groups in the 5-position, are quite viscous. The lower molecular weight members having no substituted hydroxyl or similar groups are quite fluid.

The N,N'-(alkoxymethyl) tetrahydrotriazones are made by first reacting the appropriate tetrahydrotriazone with aqueous formaldehyde and then adding an excess of an alcohol which reacts with the dimethylol derivative to give the desired product. Basic catalysts are used in the first stage, whereas acidic catalysts are used in the last step. The temperature used to effect the reaction between the tetrahydrotriazone and formaldehyde may vary from 0 to 100° C. The time required depends upon the temperature used and hence may vary from 15 minutes to a few days. It is preferred to use a temperature of 25–100° C. and a reaction time of 15 minutes to 24 hours. The reaction between the alcohol and the dimethylol derivative of the tetrahydrotriazone may be carried out at temperatures of 0–100° C., but temperatures of 25–50° C. are preferred because of the undesirable side reactions produced at higher temperatures.

The molar ratio of formaldehyde to tetrahydrotriazone should be at least 2:1. The molar ratio of alcohol to the dimethylol tetrahydrotriazone should also be at least 2:1, but it is preferred that a larger excess of alcohol be used in order to reduce the concentration of water and thus effect more nearly complete reaction. It is preferred to concentrate the aqueous solution of the dimethylol derivative of the tetrahydrotriazone before adding the alcohol since this reduces the amount of excess alcohol required.

The dimethylol derivative of tetrahydrotriazone may be made using other forms of formaldehyde such as para-formaldehyde and trioxane and solvents other than water such as ethanol, methanol, dioxane, etc. By carrying out the addition of formaldehyde to the tetrahydrotriazone in an alcohol solution the desired alkoxymethyl derivative can readily be obtained by subsequent acidification of the reaction medium.

The desired product can be prepared without isolating any of the intermediate compounds; that is, a solution of the tetrahydrotriazone can be made by any of the procedures described in copending application Serial No. 331,665, filed April 25, 1940 by W. J. Burke. The subsequent treatment of this solution with formaldehyde and an alcohol results in the formation of the N,N'-bis-(alkoxymethyl) derivative.

The desired product can be obtained without forming the tetrahydrotriazone as an intermediate; that is, urea and formaldehyde may be reacted in such proportions that a tetramethylolurea is first formed, which can then be reacted with the appropriate primary amine to give the dimethylol derivative of the tetrahydrotriazone, which on subsequent treatment with an alcohol gives the N,N'-(alkoxymethyl) derivative. Another route to the desired product consists in reacting the appropriate dialkyl ether of dimethylolurea with formaldehyde and treating this product with the appropriate primary amine.

The more detailed practice of the invention is illustrated by the following examples wherein the parts given are by weight. There are, of course, many forms of the invention other than these specific embodiments.

EXAMPLE I.—*Tetrahydro-1,3-bis-(methoxymethyl)-5-methyl-2(1)-s-triazone*

A mixture of 40 parts of tetrahydro-5-methyl-2-(1)-s-triazone, 63 parts of 37% aqueous formaldehyde, and 1.9 parts of barium hydroxide is stirred for a few minutes during which time the temperature rises spontaneously to 40° C. The mixture is heated at 70–80° C. for 15 minutes and then concentrated to about eighty parts of a viscous syrup under reduced pressure at about 50° C. Two hundred and eighty parts of methanol containing 2.7 parts of concentrated hydrochloric acid is added and the mixture allowed to stand for approximately two hours. After neutralizing the hydrochloric acid with sodium carbonate, the methanol is evaporated and the residue dissolved in chloroform. The insoluble material is filtered off and the solvent removed by distillation. Forty-five parts (64% yield) of tetrahydro-1,3-bis-(methoxymethyl)-5-methyl-2(1)-s-triazone, a water-white mobile liquid distilling at 120–122° C./2–3 mm. is obtained. This compound is soluble in water, ethanol, chloroform, and benzene and insoluble in paraffin hydrocarbons such as petroleum ether.

| Analysis | Carbon | Hydrogen | Nitrogen |
| --- | --- | --- | --- |
| Found | 47.59 | 7.92 | 20.73 |
| Calculated for $C_8H_{17}N_3O_2$ | 47.29 | 8.38 | 20.69 |

Textiles may be advantageously modified by treatment with this product. A typical treatment is as follows: ten parts of tetrahydro-1,3-bis-(methoxymethyl)-5-methyl-2(1)-s-triazone, 2 parts of acetic acid, and 0.4 part of p-toluenesulfonic acid are dissolved in 87.6 parts of water. A skein of viscose rayon yarn (150 denier, 40 filament) of 10 parts in weight is immersed in this solution and then dried by centrifuging and exposing to air at room temperature. The dried skein is heated to 140° C. for 3 minutes, washed in mild soap solution at 70° C., rinsed, and dried. Its weight is now 10.7 parts; the increase in weight corresponds to a gain of 7%, based on the original weight of yarn. The treated yarn is superior to an untreated yarn control in several respects, indicated by the following tests:

1. *Resistance to creasing.*—Treated and untreated yarns which have been conditioned at 25° C. and 50% relative humidity are wound separately over a double-edged knife blade under a uniform tension of 50 g. After 15 minutes, the tension is released and each thread cut along one edge of the knife blade. The creased segments of the yarn are allow to relax for 10 minutes while lying on a horizontal, smooth surface. The degree that the thread recovers from the creasing is an index of its resilience, and the angle formed by the thread is known as the crease angle. For treated yarn the crease angle is 122°, whereas for untreated yarn it is 95°; thus, with reference to the untreated yarn, the treated yarn is 28% better in resistance to creasing.

2. *Elastic recovery.*—Segments of treated and untreated yarn which are 4.000" in length are rapidly stretched by 4% (i. e., to 4.160") and held in the elongated position for 100 seconds before tension is released. After releasing the tension, the treated yarn spontaneously contracts 0.091" during the first 60 seconds, whereas the untreated yarn contracts only 0.077" in this same period of time. The relative superiority in elastic recovery conferred by this treatment is thus 18%.

3. *Swelling.*—Skeins of treated and untreated yarns of known weight are conditioned at 25° C. and 50% relative humidity until they are constant in weight. They are thoroughly wet with water, subjected to a short centrifugation and then quickly weighed in a covered dish. The gain in weight of untreated yarn is 100%, while the treated yarn gains only 54% in weight. Relative to untreated yarn, the swellability is reduced by 85%. This modification in properties is accompanied by great improvement in the ease and rapidity of drying of treated fabrics, e. g., after dyeing or laundering procedures.

EXAMPLE II.—*Tetrahydro-1,3-bis-(methoxymethyl)-5-beta-hydroxyethyl-2(1)-s-triazone*

A mixture of 80 parts of tetrahydro-5-beta-hydroxyethyl-2(1)-s-triazone, 95 parts of 37% aqueous formaldehyde, and 1.5 parts of barium hydroxide is stirred for 30 minutes during which time the temperature rises spontaneously to 40° C. The mixture is then heated at 83° C. for 15 minutes and cooled to room temperature. Four hundred and eighty parts of methanol containing 5.5 parts of hydrogen chloride is added and the mixture allowed to stand 20 minutes. After neutralizing the acid, the methanol is evaporated and the residue dissolved in chloroform. A small amount of insoluble material is filtered off and the chloroform and other low-boiling material removed by distillation at low pressure. The residue, tetrahydro-1,3-bis-(methoxymethyl)-5-beta-hydroxyethyl-2(1)-s-triazone, is a viscous, slightly yellow liquid, soluble in water, alcohol, benzene, and ethyl acetate but insoluble in petroleum ether. The yield is 96 parts.

| Analysis | Carbon | Hydrogen | Nitrogen |
| --- | --- | --- | --- |
| Found | 45.56 | 8.42 | 18.61 |
| Calculated for $C_9H_{19}N_3O_4$ | 46.4 | 8.2 | 18.0 |

EXAMPLE III.—*Tetrahydro-1,3-bis-(methoxymethyl)-5-isobutyl-2-(1)-s-triazone*

A mixture of 47.1 parts of tetrahydro-5-isobutyl-2-(1)-s-triazone, 100 parts of 37% aqueous formaldehyde, 2 parts of barium hydroxide is heated at 80–90° C. for 10 minutes and then cooled to room temperature. Eight hundred (800) parts of methanol containing 12 parts of concentrated hydrochloric acid is added and the mixture allowed to stand 5 hours. After neutralizing the acid the methanol is evaporated and the residue dissolved in chloroform. A small amount of insoluble material is filtered off and the chloroform and other low-boiling material removed by distillation at low pressure. Twenty-two (22) parts of tetrahydro-1,3-bis-methoxymethyl)-5-isobutyl-2(1)-s-triazone, a water-white mobile liquid distilling at 140–145° C./5 mm. is obtained. This compound is soluble in water, ethanol, chloroform, and benzene but insoluble in paraffin hydrocarbons.

| Analysis | Carbon | Hydrogen | Nitrogen |
|---|---|---|---|
| Found | 53.85 | 9.68 | 17.33 |
| Calculated for $C_{11}H_{23}N_3O_3$ | 53.8 | 9.4 | 17.2 |

In the process of this invention a tetrahydrotriazone

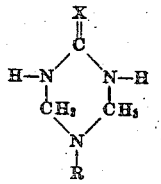

wherein R is an aliphatic monovalent hydrocarbon radical which may be substituted or unsubstituted, saturated or unsaturated, and X is either oxygen or sulfur, is reacted at 0–100° C., but preferably at 25–100° C., in the presence of a basic catalyst with formaldehyde, then at 0–100° C., but preferably at 25–50° C., in the presence of an acidic catalyst, the resulting product is reacted with an alcohol.

Any tetrahydrotriazone of the above formula may be used including: tetrahydro-5-methyl-2(1)-s-triazone, tetrahydro-5-beta-hydroxyethyl-2(1)-s-triazone, tetrahydro-5-tert. butyl-2(1)-s-triazone, tetrahydro-5-benzyl-2(1)-s-triazone, tetrahydro-5-dimethylaminoethyl-2(1)-s-triazone, tetrahydro-5-allyl-2(1)-s-triazone, tetrahydro-5-methyl-2-thio-2(1)-s-triazone, tetrahydro-5-furfuryl-2(1)-s-triazone, tetrahydro-5-cyclohexyl-2-thio-2(1)-s-triazone, and tetrahydro-5-dodecyl-2-thio-2(1)-s-triazone.

Any alcohol R'OH may be employed in which R' is an aliphatic monovalent hydrocarbon radical which may be saturated or unsaturated, acylic or cyclic, unsubstituted or substituted by groups such as hydroxy, alkoxy, aryl, dialkylamino, etc. which are unreactive under the conditions of the reaction. The chain of carbon atoms may be interrupted by heteroatoms such as oxygen or sulfur. Alcohols which may be employed include methyl, ethyl, propyl, isopropyl, butyl, isobutyl, tert.-butyl, octyl, dodecyl, beta-hydroxyethyl, methoxymethyl, ethoxymethyl, methoxyethyl, ethoxyethyl, butoxyethyl, benzyl, allyl, and cyclohexyl alcohols, i. e., alcohols free from reactive groups other than hydroxyl.

The first stage of the process, i. e., the reaction with formaldhyde, is carried out preferably in the presence of a basic catalyst, i. e., any substance capable of effecting a pH of greater than 7 when dissolved in water, e. g. triethylamine, pyridine, $Ca(OH)_2$, NaOH, KOH, $Mg(OH)_2$, etc.

The second stage, i. e., the reaction of the dimethyloltetrahydrotriazone with the alcohol is carried out in the presence of an acidic catalyst, i. e., catalyst capable of effecting a pH of less than 7 when dissolved in water, e. g., HCl, $H_2SO_4$, $H_3PO_4$, formic acid, citric acid, $NaHSO_4$, $NaH_2PO_4$, etc.

The general formula for the tetrahydro-1,3-bis-(alkoxymethyl)-5-substituted-2(1)-s-triazones of this invention is as follows:

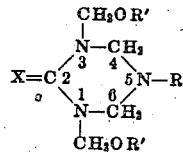

where X is a chalcogen of atomic weight less than 33, i. e., oxygen or sulfur, R' and R are monovalent aliphatic hydrocarbon radicals which may be saturated or unsaturated, substituted or unsubstituted as previously pointed out by groups which do not interfere with the present reaction such as alkoxy, hydroxy, or aryl groups.

The compounds of this invention may also be defined as tetrahydrotriazones having attached to the two carbon a chalcogen of atomic weight less than 33, on the 5 nitrogen a monovalent hydrocarbon radical joined thereto by a terminal aliphatic carbon, and on the 1 and 3 nitrogens monovalent radicals consisting of a monovalent hydrocarbon radical joined by a terminal aliphatic carbon thereof to an oxygen which is in turn joined, through a methylene ($CH_2$) group, to said nitrogens. The 4 and 6 carbons have their extranuclear valences satisfied by hydrogen atoms. Monovalent substituents on the 5 nitrogen and on the oxygen of the oxymethyl groups attached to the 1 and 3 nitrogens which consist of hydrocarbon radicals substituted and/or interrupted by inert groups such as ether, hydroxy and the like are equivalent, for the purposes of this invention, to the simple hydrocarbon radicals. The invention thus includes the following: tetrahydro-1,3-bis-(ethoxymethyl)-5-methyl-2(1)-s-triazone, tetrahydro-1,3-bis-(propoxymethyl)-5-ethyl-2(1)-s-triazone, tetrahydro-1,3-bis-(isopropoxymethyl)-5-butyl-2(1)-s-triazone, tetrahydro-1,3-bis-(isobutoxymethyl)-5-cyclohexyl-2(1)-s-triazone, tetrahydro-1,3-bis-(butoxymethyl)-5-methyl-2(1)-s-triazone, tetrahydro-1,3-bis-(octoxymethyl)-5-propyl-2(1)-s-triazone, tetrahydro-1,3-bis-(undecoxymethyl)-5-isobutyl-2(1)-s-triazone, tetrahydro-1,3-bis-(tertbutoxymethyl)-5-methyl-2(1)-s-triazone and tetrahydro-1,3-bis-(sec-butoxymethyl)-5-ethyl-2(1)-s-triazone, tetrahydro-1,3-bis-(allyloxymethyl)-5-methyl-2(1)-s-triazone, tetrahydro-1,3-bis-(crotyloxymethyl)-5-butyl-2(1)-s-triazone, tetrahydro-1,3-bis-(propargyloxymethyl)-5-propyl-2(1)-s-triazone and their unsaturated analogs; tetrahydro-1,3-bis-(methoxymethyl)-5-beta-phenylethyl-2(1)-s-triazone, tetrahydro-1,3-bis-(methoxymethyl)-5-allyl-2(1)-s-triazone, tetrahydro-1,3-bis-(methoxymethyl)-5-gamma-chloropropyl-2(1)-s-triazone and their analogs; tetrahydro-1,3-bis-(undecoxymethyl)-5-gamma-chloropropyl-2(1)-s-triazone, and the thio analogs, including tetrahydro-1,3-bis-(methoxymethyl)-5-methyl-2-thio-2(1)-s-triazone and its analogs, tetrahydro-1,3-bis-(methoxy-methyl)-5-cyclohexyl-2-thio-2(1)-s-triazone, tetrahydro-1,3-bis(ethoxymethyl)-5-dodecyl-2-thio-2(1)-s-triazone.

The products of this invention are particularly useful as modifying agents for cellulosic materials. Untreated cellulosic fibers tend to wrinkle or crease in use and return to their original shape and appearance only very slowly on standing or when laundered and ironed. When such fibers are treated with the products of this invention they are markedly more resilient than the unmodified rayon and tend to wrinkle and crease to a lesser extent. This improved resilience or recovery from deformation is particularly important in pile fabrics such as rugs, carpets, velvets, plush fabrics, etc. Rayon fibers modified with the products of this invention are excellently suited for use as upholstery material for furniture and automobiles. Cellulosic materials have little dye receptivity for certain types of dyes. By treating cellulosic materials with the products of this invention basic nitrogen is incorporated into the fiber and hence better dye receptivity and light fastness, etc. are obtained. The products of this invention are capable of reacting with hydroxylated polymeric materials and thus serve as cross-linking agents. For example, cellulose acetate is highly soluble in acetone but may be rendered substantially insoluble by treatment with the products of this invention. Cross-linking in this manner not only reduces solubility of the cellulose acetate but also raises the softening point and hence the safe ironing temperature of such materials. Other hydroxylated polymeric materials such as polyvinyl alcohol, hydroxylated rubber, etc. may be insolubilized by treatment with the products of this invention and thus rendered useful in a wider variety of applications. For example, polyvinyl alcohol treated with these products becomes highly resistant to water and can be used for tubes, belts, unsupported films, containers for liquids such as oils, etc., bags for foodstuffs, such as coffee, tea, bread, and the like. Polymeric materials may be made from the products of this invention by condensation with poly-functional compounds such as diols, dithiols, etc. These polymeric materials may be used in fibers, waxes, etc. Fibers formed from them have the advantage of containing tertiary nitrogen and hence have good dyeing properties.

The above description and examples are intended to be illustrative only. Any modification of or variation therefrom which conforms to the spirit of the invention is intended to be included within the scope of the claims.

What is claimed is:

1. A tetrahydrotriazone having the 2 carbon attached by a double bond to a chalcogen of atomic weight less than 33, the 5 nitrogen attached to a monovalent hydrocarbon radical by a terminal aliphatic carbon thereof, the 1 and 3 nitrogens attached, through an oxymethyl ($-CH_2-O-$) group, to a monovalent hydrocarbon radical by a terminal aliphatic carbon thereof, and the 4 and 6 carbons attached to hydrogen atoms.

2. A 1,3-bis-(alkoxymethyl)-5-alkyltetrahydrotriazone wherein the 2 carbon is joined to a chalcogen of atomic weight less than 33.

3. A 1,3-bis-(alkoxymethyl)-5-alkyltetrahydrotriazone wherein the 2 carbon is joined to oxygen.

4. Tetrahydro - 1,3 - bis - methoxymethyl -5-methyl-2(1)-s-triazone.

5. Tetrahydro-1,3-bis-(methoxymethyl)-5-isobutyl-2(1)-s-triazone.

6. Tetrahydro - 1,3 - bis - (ethoxymethyl) -5-methyl-2(1)-s-triazone.

7. Process which comprises reacting 2-oxo-5-methyltetrahydrotriazone with formaldehyde at 25–100° C. in the presence of a basic catalyst and then at 25–100° C. in the presence of an acidic catalyst with methanol.

8. Process which comprises reacting a tetrahydrotriazone having the 2 carbon joined to a chalcogen of atomic weight less than 33, the 1 and 3 nitrogens and the 4 and 6 carbons extranuclearly to hydrogen, the 5 nitrogen to a monovalent hydrocarbon radical through a terminal aliphatic carbon thereof, with formaldehyde at 25–100° C. and then, in the presence of an acidic catalyst, with an alcohol free from reactive groups other than hydroxyl.

9. Process which comprises reacting a 2-oxo-5-alkyltetrahydrotriazone having the extranuclear valences of the 4 and 6 carbons and the 1 and 3 nitrogens satisfied by hydrogen with formaldehyde at 25–100° C. in the presence of a basic catalyst, and then at 25–100° C. in the presence of an acidic catalyst with an alcohol wherein hydroxyl is the only reacting group.

10. Process which comprises reacting a 2-oxo-5-alkyltetrahydrotriazone having the extranuclear valences of the 4 and 6 carbons and the 1 and 3 nitrogens satisfied by hydrogen with formaldehyde at 25–100° C. in the presence of a basic catalyst, and then at 25–100° C. in the presence of an acidic catalyst with an alkanol.

WILLIAM JAMES BURKE.